(12) United States Patent
Sharp et al.

(10) Patent No.: US 8,340,131 B2
(45) Date of Patent: Dec. 25, 2012

(54) EFFICIENT BROADCAST OF DATA IN A COMMUNICATION NETWORK

(75) Inventors: Courtney Sharp, San Francisco, CA (US); Jason Ostrander, San Francisco, CA (US); Joseph Polastre, San Francisco, CA (US)

(73) Assignee: Sentilla Corporation, Inc., Redwood City, CA (US)

( * ) Notice: Subject to any disclaimer, the term of this patent is extended or adjusted under 35 U.S.C. 154(b) by 224 days.

(21) Appl. No.: 12/434,397

(22) Filed: May 1, 2009

(65) Prior Publication Data

US 2009/0274158 A1 Nov. 5, 2009

Related U.S. Application Data

(60) Provisional application No. 61/050,570, filed on May 28, 2008.

(51) Int. Cl.
*H04J 3/24* (2006.01)
(52) U.S. Cl. .......................... 370/474; 717/111; 717/159
(58) Field of Classification Search .................. None
See application file for complete search history.

(56) References Cited

U.S. PATENT DOCUMENTS

| | | | | |
|---|---|---|---|---|
| 5,732,275 A * | 3/1998 | Kullick et al. | ................ | 717/170 |
| 5,752,042 A * | 5/1998 | Cole et al. | ...................... | 717/173 |
| 5,765,171 A * | 6/1998 | Gehani et al. | ......................... | 1/1 |
| 5,974,454 A * | 10/1999 | Apfel et al. | .................... | 709/221 |
| 6,049,671 A * | 4/2000 | Slivka et al. | ................... | 717/173 |
| 6,151,708 A * | 11/2000 | Pedrizetti et al. | ............. | 717/173 |
| 6,199,204 B1 * | 3/2001 | Donohue | ....................... | 717/178 |
| 6,282,709 B1 * | 8/2001 | Reha et al. | ..................... | 717/175 |
| 6,557,054 B2 * | 4/2003 | Reisman | ......................... | 710/33 |
| 6,789,255 B1 * | 9/2004 | Pedrizetti et al. | ............. | 717/169 |
| 6,990,660 B2 * | 1/2006 | Moshir et al. | .................... | 717/171 |
| 7,016,944 B1 * | 3/2006 | Meyer et al. | .................. | 709/218 |
| 7,093,246 B2 * | 8/2006 | Brown et al. | ................. | 717/173 |
| 7,171,660 B2 * | 1/2007 | McCaleb et al. | .............. | 717/171 |
| 7,478,381 B2 * | 1/2009 | Roberts et al. | ................. | 717/168 |
| 7,979,439 B1 * | 7/2011 | Nordstrom et al. | ........... | 707/741 |
| 2005/0203968 A1 * | 9/2005 | Dehghan et al. | .............. | 707/203 |
| 2007/0263671 A1 * | 11/2007 | Hu et al. | ....................... | 370/503 |

OTHER PUBLICATIONS

Akdere, M. et al., "A Comparison of Epidemic Algorithms in Wireless Sensor Networks," Computer Communications, 2006, pp. 2450-2457, vol. 29.*
Amir, Y. "Replication Using Group Communication Over a Partitioned Network," Thesis for the Degree "Doctor of Philosophy," Senate of the Hebrew University of Jerusalem, 1995, 94 pages.*
PCT International Search Report and Written Opinion, PCT Application No. PCT/US2009/042586, Jun. 25, 2009, 12 pages.

* cited by examiner

*Primary Examiner* — Ayaz Sheikh
*Assistant Examiner* — Faiyazkhan Ghafoerkhan
(74) *Attorney, Agent, or Firm* — Fenwick & West LLP (57) ABSTRACT

A system (and a method) are disclosed for reliably disseminating a state of a node in a large network consisting of nodes with constrained resources. The system comprises a process embodied by a state machine comprised of an advertise state, a request state, and a share state. The system processes input events, mutates its internal state, and outputs side effects. The outputs from one node in the network may become inputs events to one or more other nodes in the network. Viral dissemination is an emergent behavior across the nodes in a network that all independently and continuously perform these input processings, state mutations, and output side effects.

18 Claims, 5 Drawing Sheets

EFFICIENT BROADCAST OF DATA IN A COMMUNICATION NETWORK

CROSS REFERENCE

This application claims a benefit of U.S. Patent Application No. 61/050,570, filed May 5, 2008, the contents of which are herein incorporated by reference.

BACKGROUND

1. Field of Art

The disclosure generally relates to the field of networking technologies and more specifically to the field of broadcasting data throughout a communication network.

2. Description of the Related Art

A communication network is composed of some number of interconnected group of nodes. Examples of communication nodes are a personal computer, a mobile phone, and a networked sensor. In most contemporary communication networks such as the Internet, a node may be a communication endpoint or may also route packets between endpoints. In this sort of network topology, endpoints are the majority of nodes and do not perform routing functions, and some additional router nodes form a hierarchical routing tree for the endpoints. Another kind of communication topology is a mesh network whereby a significant portion of the nodes acting as endpoints also perform routing functions, forwarding messages through the network on behalf of their network peers.

Yet another kind of network is an epidemic network where each node uses only a broadcast mechanism and keeps no information on its neighbors; each node must be at least intermittently connected to any other node through some possibly varying communication connectivity in the network. All networking topologies depend on nodes being able to directly communicate with one or more other nodes in the network, and routing algorithms require there exist one or more routes over a series of direct connections between two or more nodes that expect to communicate.

One problem in networking is disseminating the same data to all nodes in a network. Examples of this kind of data are application code, packetized messages, and network configuration parameters such as security keys. In some network instances, the difficulty of broadcasting this data is made worse where there are a large number of nodes in the network, the data is large relative to the available network bandwidth, the network is sensitive to excessive power utilization, or the network is composed of some or many unreliable or lossy communication links. In other network instances, these difficulties may collude to exacerbate the problem such as a network that contains thousands of devices that each have limited available power, limited communication bandwidth, lossy communication links, limited memory, and limited computation resources.

Previous attempts at solving this problem have inadequately addressed issues inherent to this type of network data dissemination. One solution uses a central computer to control data dissemination, which can be relatively easy to implement if the network provides a reliable transmission protocol. Nevertheless, this solution suffers from poor performance as the number of the nodes in the network increase and reliability of node communication links decrease. Moreover, this solution requires a capable central computing resource. Other solutions use distributed methods, such as Deluge and Trickle. However, Deluge only focuses on and is specialized for program code dissemination. Likewise, Trickle is only a message advertisement algorithm and has inefficient qualities in terms of power and bandwidth. Thus, both Deluge and Trickle are ineffective with the constraints of network bandwidth and device resources. In addition, general peer-to-peer distribution systems, such as BitTorrent and Gnutella, have also been used to provide similar functions. However, these systems typically require a central controller for coordinating data transfers and are not designed to run on resource-constrained devices.

Therefore, the present state of the art lacks, inter alia, a system or a method that reliably disseminates data in a network that may have a large number of nodes, limited power, limited communication bandwidth, lossy communication links, limited memory, or limited computation resources.

SUMMARY

One embodiment of a disclosed system and method includes a data distribution protocol that reliably disseminates data in a large lossy network consisting of nodes with constrained resources.

The present disclosure includes a system that comprises a process for coordinating communication and processing data; a storage interface for storing data and a corresponding metadata such as an index and version identifier; a network interface for sending and receiving messages that contain data and metadata; a comparison module for determining whether the version identifier received via the network interface indicates a newer version of the data than the version identifier stored in the storage module; and a handler to dispatch processing on reception of a complete data transmission.

According to one embodiment, a system disseminates data of a local node in a network composed of multiple communication hops by storing data, and index, and a version identifier of the data in the local node storage; transmitting a message advertising an index and a version identifier corresponding to the data stored in the local node storage; receiving a message requesting data corresponding to an index and version identifier from a remote node in the network; determining whether the version identifier corresponding to the data and index requested by the remote node is the same or older as the version identifier corresponding to the data stored in the local node storage; and if so, transmitting messages sharing the data stored in the local node storage to satisfy the message request.

In an alternate embodiment, a system further receives a message advertising an index and version identifier corresponding to data is stored in a remote node storage; determines whether the received advertising message contains an index that is unknown or contains a version identifier that is newer than the version identifier corresponding to the data stored in the local node storage; if so, transmits a message requesting data stored in the remote node storage; receives one or more messages sharing the data corresponding to the index and version identifier stored in the remote node storage; and updates the data and the corresponding version identifier stored in the local node storage with the data and the corresponding version identifier received from the sharing message.

In an alternate embodiment, the system described above further receives a message sharing data for an index and version identifier corresponding to data is stored in a remote node storage; determines whether the received sharing message contains an index that is unknown or contains a version identifier that is newer than the version identifier corresponding to the data stored in the local node storage; if so, updates the data and the corresponding version identifier stored in the local node storage with the data and the corresponding version identifier received from the sharing message.

In an alternate embodiment, the system described above further receives a message sharing data for an index and version identifier corresponding to data is stored in a remote node storage; determines whether the received sharing message contains a version identifier that is older than the version identifier corresponding to the data stored in the local node storage; if so, treats the sharing message as a request for the entire data stored in the local node storage begins to share messages to satisfy the implicitly inferred request.

In an alternate embodiment, the system described above receives a message advertising a version identifier corresponding to data stored in a remote node storage; determines whether the version identifier received in the advertising message indicates an older version than the version identifier corresponding to the data stored in the local node storage; and if so, transmits a message sharing the data and the corresponding version identifier stored in the local node storage. In another alternative embodiment, the system further transmits a message advertising a version identifier corresponding to the updated data stored in the local node storage; receives a message advertising a version identifier corresponding to data stored in a remote node storage; determines whether the version identifier received in the advertising message indicates the same version as the version identifier corresponding to the updated data stored in the local node storage; and if so, pauses the transmission of the message advertising the version identifier corresponding to the updated data stored in the local node storage for a period of time.

In the various embodiments as disclosed, given some input event, a local node mutates its internal state and outputs a side effect. The input events are messages received, timeout alarms fired, and locally synthesized events. The internal state is the internal mode of the node such as "advertise", "request", or "share", and the value of any timeout alarms. The output side effects send messages, write data, set or reset timeout alarms, or synthesize input events. The output side effect from one node may become the input event at another node. Viral dissemination is an emergent behavior across the nodes in a network performing these state mutations and output side effects.

The disclosed configurations greatly simplify distributing data of a node to a large network of devices because the emergent viral dissemination protocol distributes the newest version of data across the network by using a local broadcast mechanism. In one embodiment, no routing information is required if the communication network provides a local broadcast mechanism such as a radio. The viral nature of the data dissemination protocol ensures that data is consistently distributed to all nodes if the network is fully connected such that some possibly varying communication path at least intermittently exists from any one node to any other node. Thus, the data dissemination protocol is reliable and effective regardless of network size and node reliability.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system or method for purposes of illustration only. One skilled in the art will readily recognize from the following description that alternative embodiments of the structures and methods illustrated herein may be employed without departing from the principles described herein.

A disclosed configuration includes a method for reliably disseminating data across a large lossy communications network. In one aspect, the network includes a plurality of disjoint nodes. Each node uses an internal state machine to determine its current action. The data is propagated to the network. Each node in the network receives the propagated data, and transitions its internal state machine based on the received data and the current state of the internal state machine. Each node may also transmit a message as determined by the current state of its internal state machine. All nodes are running the same algorithm (or process). Consequently, all nodes participate equally in the data dissemination since there are no controlling nodes and no specific forwarding nodes. An example of a node is further described below with respect to Figure (or FIG.) 1.

Each node maintains version identifiers for each index and its file (or image). The data is a portion (or chunk) of a file (or image). A file (or image) comprises all data associates with a particular version. A version is a specific form or instance of data or information. In such contexts a version may include a subversion. The version information as indicated by the index and version identifier is periodically communicated to neighboring nodes with an advertisement message. An index is a unique identifier for a piece of data across all versions of the data. The advertisement message is a message from a node that provides (or advertises) information from that node. A message may comprise a single message or a sequence of messages transmitted from a node and receivable elsewhere, e.g., another node. The time periods between advertisement messages are determined by the network density. As more nodes become available, the advertisement rate adjusts through suppression.

When a node receives new data, it updates the version identifier stored on the node with the version identifier corresponding to the new data, and begins transmitting a message advertising the updated version identifier. When neighboring nodes receive the message advertising the updated version identifier from this node, they will determine that new data is available and request it. The node with the new data will then begin transmitting a message sharing the new data with the neighboring nodes. Once these neighboring nodes have the complete data, they will begin transmitting a message advertising the new data. Other nodes receiving the advertising messages from these neighboring nodes will determine whether they have the new data, and if not, will request it. Accordingly, the new data propagates through the entire network.

In addition, when a new node joins the network, it receives one or more messages advertising the indexes and version identifiers corresponding to the current data in the network; determine whether the network contains any new data; and if so, request the data from neighboring nodes and invoke a handler for the new data once it has been received. The handler will then determine what will be done with the new data. Subsequently, the network is able to converge to a consistent data payload through the viral nature of the algorithm that propagates across the nodes.

Figure 1:
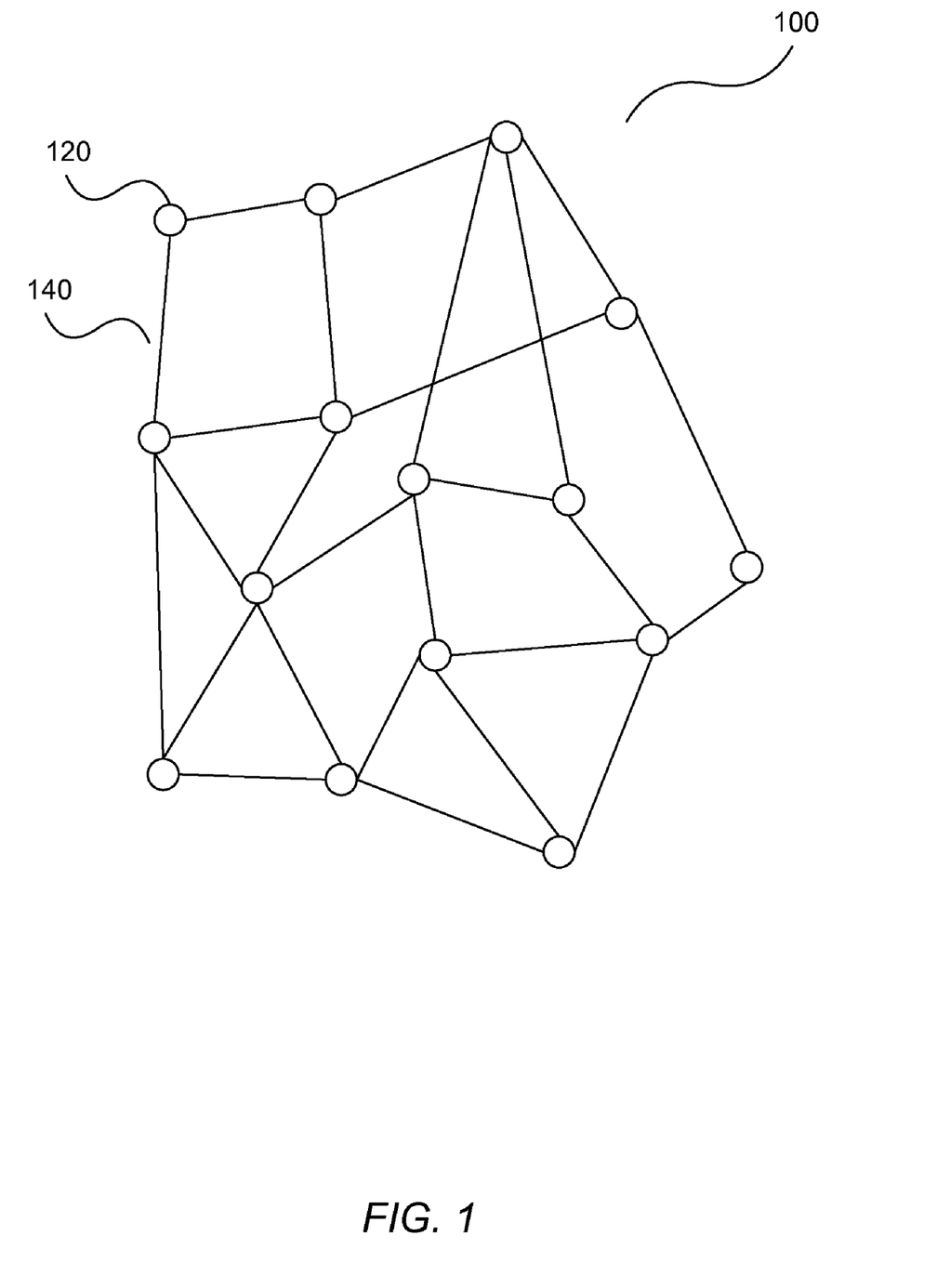
FIG. 1 illustrates one embodiment of a network environment.

Referring now to FIG. 1, the diagram illustrates an embodiment of a network environment 100. The network environment 100 includes a plurality of nodes 120, links 140, and network protocols (not shown). The nodes 120 are interconnected together through a plurality of links 140. The communications between the nodes 120 follow the network protocols. Each node 120 is a computing device capable of storing, processing, and communicating data. In one embodiment, the node 120 is a mote. A mote is a wireless sensor device equipped with embedded processors, sensors, and radios. The mote may also include a memory or other data storage unit. A mote collects, processes, and stores sensory data by running application code. The application code and associated mote parameters are stored as generic data. A mote stores a version identifier corresponding to this data, and further shares the data and the corresponding version identifier with other nodes 120 in a wireless sensor network 100 through the links 140. It is noted that in one embodiment, the nodes 120 and network 100 have constrained resources or are a lossy network.

The link 140 is a communication channel for a node 120 to transmit data to other connected nodes 120. In one embodiment, the link 140 is a wireless connection. For example, the link 140 can be a radio channel where the two nodes 120 interconnected through the radio channel 140 share the same radio frequency. The network protocols ensure that the nodes 120 can transmit, receive, and forward data to and/or from other nodes 120 in the network 100.

It is noted that although the discussion herein is in the context of motes and epidemic networks, these are by way of example only. In addition to motes and epidemic networks, the principles disclosed herein apply to other networked computing systems. Moreover, with respect to lossy networks, it is noted that the principles disclosed herein with respect to wireless systems apply to any communications link, regardless of link reliability. For example, the principles disclosed herein can apply to wired embedded control systems. It also is noted an epidemic network differs from a mesh network. A mesh network maintains explicit routing information to optimize for one-to-one node communication. In contrast, an epidemic network requires no routing information; rather, an epidemic network generally uses a local area broadcast to optimize for network-global communication. Such local area broadcast can be relatively inexpensive.

Figure 2:
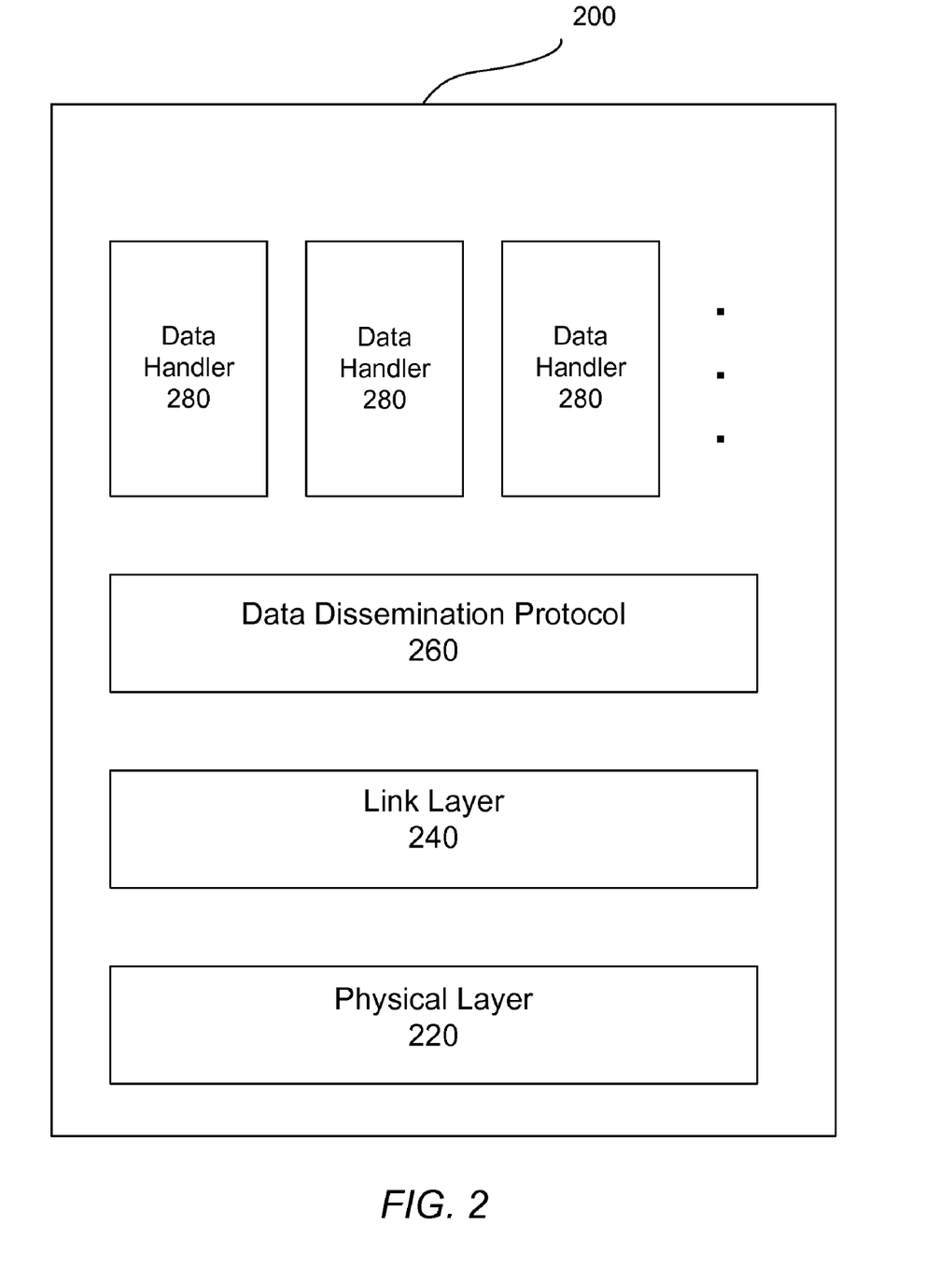
FIG. 2 is a block diagram showing one embodiment of a software system configurable for use in connection with the disclosed environment.

Now referring to FIG. 2, the block diagram shows one embodiment of a software system 200. The software system 200 includes a physical layer 220, a link layer 240, a data dissemination protocol 260, and a plurality of data handlers 280. The physical layer 220 communicatively couples with the link layer 240. The link layer 240 communicatively couples with the data dissemination protocol 260. The data dissemination protocol 260 further couples with a plurality of data handlers 280.

In one embodiment, the physical layer 220 comprises a plurality of physical radio signals. Specifically, the radio layer handles, for example, converting data bits to physical radio waves, along with the resulting error correction in that process.

The link layer 240 controls the physical layer 220, and provides basic data sending (or transmitting) and receiving functionality. Moreover, the link layer 240 may include a sub-layer called Medium Access Control (MAC) layer (not shown). The MAC layer assists each node 120 to decide when and how to access the communications medium 140 in order to avoid communication collisions. A problem occurs when two nodes 120 send data at the same time over the same transmission medium or channel 140. The link layer provides the MAC that checks that the channel is clear before transmitting and also handles the addressing of data. In one embodiment, the principles disclosed herein are applicable within an open systems interconnect (OSI) networking model.

The data dissemination protocol 260 directly interacts with the link layer 240. The data dissemination protocol 260 controls the transmitting and receiving of data, the timeouts on transmissions, and the maintenance of the internal protocol state machine. The data dissemination protocol 260 includes a versioning mechanism for comparing data of nodes 120 in the network 100 and resolving differences in data versions among the nodes 120. The protocol 260 involves a viral dissemination of data, which means that all nodes 120 in the network 100 will eventually receive the data, regardless of when the node 120 joined the network 100. Such propagation of data via the data dissemination protocol 260 is reliable in varying network topologies, regardless of differences in network density, network traffic, and network diversity. Because the protocol 260 is indifferent to temporal effects, a node 120 does not need to wait for a synchronization event to begin acting on newly received data. The protocol 260 supports the fragmentation and reassembly of data, including fragmented data that arrives out of sequence. Finally, the protocol 260 uses a constant size of memory per instance, which enables the protocol 260 to run on a resource-constrained device.

In addition, the data dissemination protocol 260 also interacts with a plurality of data handlers 280. The data handling architecture follows standard software design patterns and allows for any number of new data handlers 280 to be created. Each data handler 280 is invoked when a completed data payload is received for that data handler. In one embodiment, the data handler 280 is an application loader for loading an executable application program into a node processor. In another embodiment, the data handler 280 is a radio parameter handler for handling radio parameters such as encryption key and radio frequency. In another embodiment, the data handler 280 is a message passing handler for passing message data to applications running on a node 120. It will be understood that the data handlers 280 shown above are examples only. Other implementations of data handlers 280 are possible. For example, a data handler could be part of a larger piece of functionality outside of aspects disclosed herein, or it could be used for receiving commands that perform a one-time function, such as rebooting a node or a remote procedure call (RPC). It will be further understood that the software system 200 shown in FIG. 2 is an example only. Other layers of software implementations may be optionally included to provide additional interfaces or enhanced functionalities.

Figure 3:
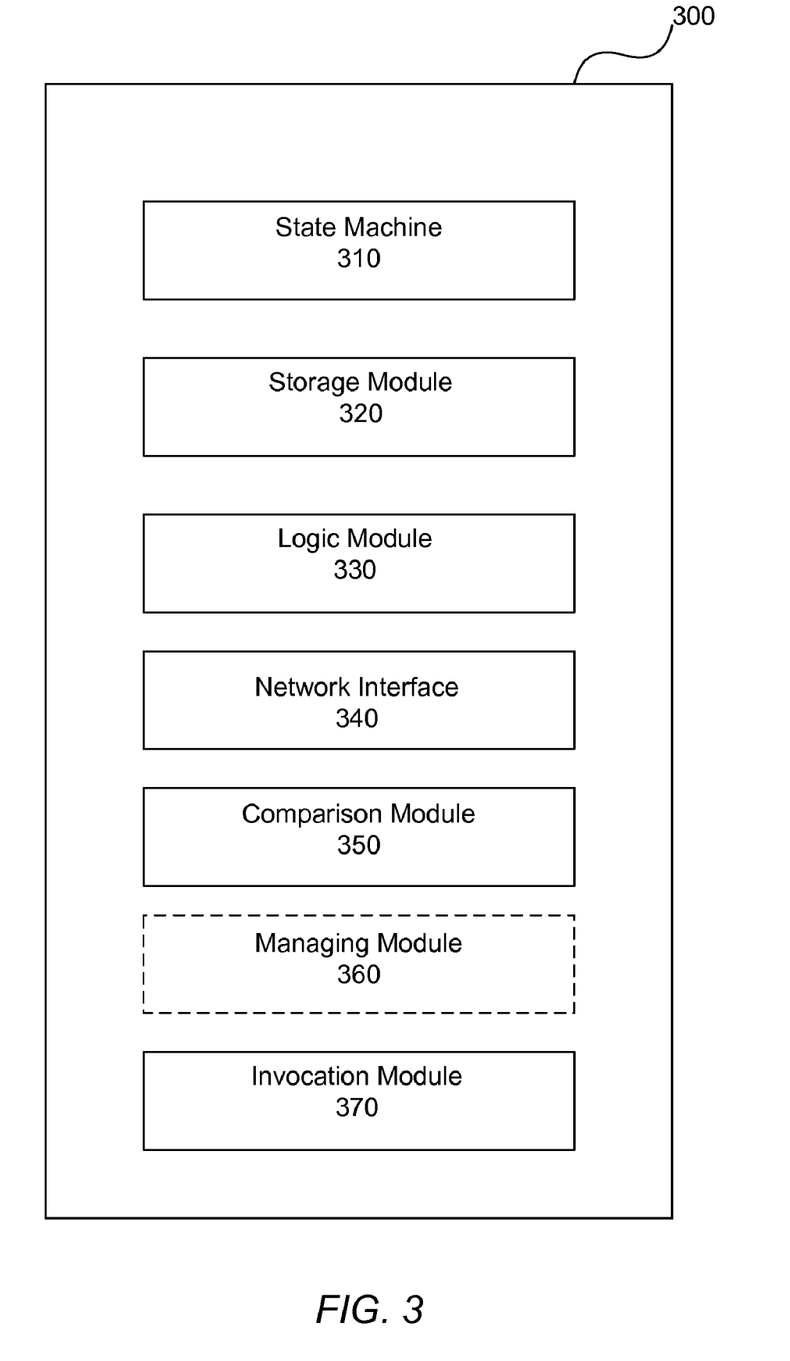
FIG. 3 is a block diagram showing one embodiment of an implementation of the state distribution protocol in FIG. 2.

FIG. 3 is a block diagram showing one embodiment of an example mechanism for implementing the data dissemination protocol 260. The mechanism 300 includes a state machine 310, a storage module 320, a logic module 330, a network interface 340, a comparison module 350, and an invocation module 370. The mechanism 300 also optionally includes a managing module 360. The logic module 330 communicatively couples the state machine 310, the storage module 320, the network interface 340, the comparison module 350, the managing module 360 if included, and the invocation module 370.

In one embodiment, the state machine 310 of a local node 120 includes three states: an advertise state, a request state, and a share state. An advertise state indicates that the local node 120 does not have a need for data. A request state indicates that the local node 120 has a need for data and, therefore, requests for new or incomplete data. A share state indicates that the local node 120 is sharing data in response to request for new or incomplete data by a remote node 120.

The state machine 310 functions to maintain the states of the local node 120. The state machine 310 is capable of receiving input data and changing its internal state based on that data. For example, if there is no received data, the state machine does not transition state. If the incoming message advertises a version identifier that matches the version identifier corresponding to data stored in the local node 120, the result is no transition of state. If the incoming message advertises a version identifier that mismatches the version identifier corresponding to data stored in the local node 120, the result is a transition to the request state. If the incoming message requests a data image with the same version identifier as the version identifier corresponding to data stored in the local node 120, the result is a transition to the share state. These are just a few examples of the state machine operation.

The state machine 310 is configured to track what action the data dissemination protocol takes. For example, the state machine 310 transitions from the advertise state to the share state when it receives a message advertising a version identifier that mismatches the version identifier corresponding to the data stored in the local node storage. The state machine 310 transitions from the advertise state to the request state when it receives a message requesting a version identifier indicating a newer version than the version identifier corresponding to the data stored in the local node storage, The state machine 310 transitions from the request state to the share state when it receives a message requesting a version identifier indicating the same version as the version identifier corresponding to the data stored in the local node and so on.

It is understood that the state machine 310 may transition from one type of state to another type of state with different inputs. For instance, in addition to the examples above, the state machine 310 also transitions from the advertise state to the share state when it receives a message requesting for data corresponding to the version identifier stored in the local node storage. Moreover, it will be understood that the state machine 310 may transition from one type of state to the same type of state. For example, the state machine 310 transitions from an advertise state to an advertise state when it receives a message advertising a version identifier indicating the same version as the version identifier corresponding to data stored in the local node storage. It will be further understood that the state machine 310 may transition from its current state to another state without an input.

In addition, the state machine 310 is configured to perform actions based on the input data and the state of the node 120. For example, in the advertise state the node 120 will send an advertising message that describes the version of the data stored on the node 120. In the request state the node 120 is requesting data missing from an incomplete image from other nodes 120 in the network 100. In the share state the node 120 is sharing image pages to satisfy another node's request. The advertise state sets the timeout value for an advertising message. The request state writes data to the local node storage when transitioning to the advertise state and so on. It is understood that the state machine 310 may generate one action or multiple actions.

The storage module 320 stores data and a version identifier corresponding to the data on the node 120. In one embodiment, the data are application images to be executed by a mote. In another embodiment, the data are received from the network 100 by another entity, such as a camera, sensor, or node that joins the network with the data in a file system.

The network interface 340 is an interface through which the data dissemination protocol 260 communicates to the link layer 240. The network interface 340 communicates with the logic module 330 and enables the logic module 330 to send and receive data over the network 100 at a higher programming level. Consequently, the network interface 340 is adapted to receive data corresponding to a version identifier from a remote node in the network, and to transmit data and the corresponding version identifier stored in the storage module 320 in the network.

The comparison module 350 compares the version identifier corresponding to the data received via the network interface 340 with the version identifier corresponding to data stored in the storage module 320 of the local node 120. In one embodiment, the comparison module 360 determines whether the version identifier corresponding to the received data indicates a newer version than the version identifier corresponding to the data stored in the storage module 320. The comparison module 350 notifies the logic module 330 of the result of the version comparison.

The invocation module 370 communicates with the logic module 350 and invokes a data handler 280 to handle received data if the comparison module 350 determines that the version identifier received via the network interface 340 indicates a newer version than the version identifier corresponding to the data stored in the storage module 320. The invocation module 370 determines which data handler 280 handles the specific data that were received and calls that data handler 280 to process the received data. The data handler 280 will then determine what will be done with the data.

The managing module 360 may be optionally included in the mechanism 300. The managing module 360 manages timeouts for transmission. The managing module 360 sets a value for timeout period for a message transmission and notifies the logic module 330 when the timeout period expires or changes. In one embodiment, the timeout period for transmission is set at a predetermined value. In another embodiment, the timeout period for transmission is calculated based on the amount of data to be transmitted. In yet another embodiment, the timeout period is set at a random value. In some embodiments, the timeout period for a message is given a default value. In some embodiments, the timeout period is reset to a new value prior to the expiration of the current timeout period. It is noted that timeouts can be set based on overheard transmissions from neighboring devices.

The logic module 330 includes processing logic that functions to process the data corresponding to the version identifier and a current state of the state machine 310. For example, the logic module 330 instructs network interface 340 to send and receive messages between nodes 120 according to one embodiment. In one embodiment, the logic module 330 determines whether to advertise, request or share data according to the data dissemination protocol and a current state corresponding to the state machine 310. In one embodiment, the logic module 330 instructs the comparison module 350 to compare versions of data. In one embodiment, the logic module 330 instructs the managing module 360 to manage timeouts for message transmissions. In another embodiment, the logic module 330 invokes the data handlers 280 and handles state transitions.

Figure 4:
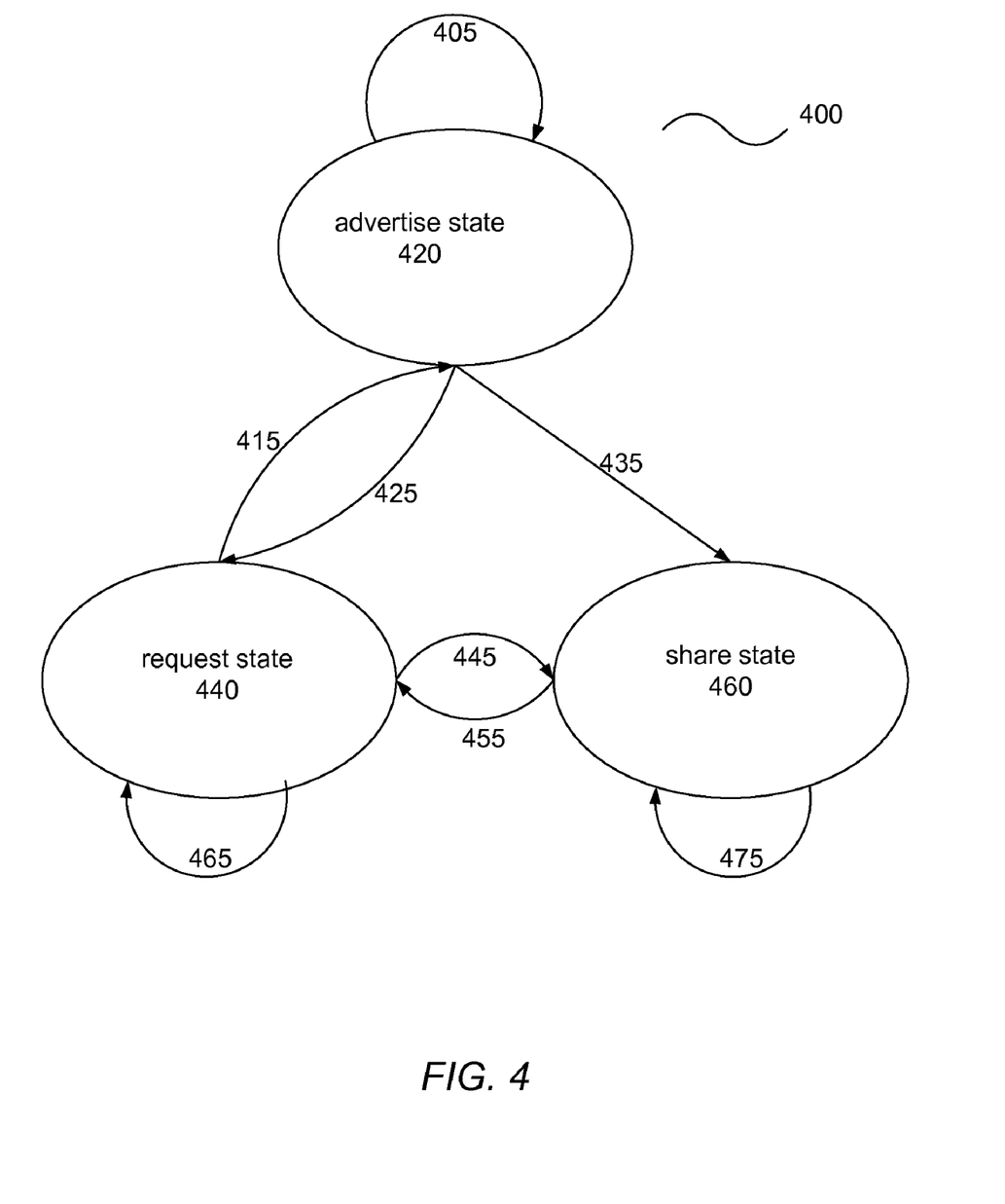
FIG. 4 illustrates one embodiment of a state machine.

FIG. 4 illustrates one embodiment corresponding to the operation of a state machine corresponding to a data dissemination protocol 260. This state diagram shows the three states of the data dissemination protocol 260: an advertise state 420, a request state 440, and a share state 460. Each arrowed connector between the states represents a transition action. In this embodiment, the state machine 310 may remain in the advertise state 420 (transition action 405), the request state 440 (transition action 465), or the share state 460 (transition action 475). It may also transition from the advertise state 420 to the request state 440 (transition action 425), from the request state 440 to advertise state 420 (transition action 415), from the advertise state 420 to the share state 460 (transition action 435), from the request state 440 to the share state 460 (transition action 445), or from the share state 460 to the request state 440 (transition action 455).

The data dissemination protocol 260 runs on each node 120 in the network 100. The protocol uses a state machine 400 with three possible states, i.e., an advertise state 420, a request state 440, and a share state 460. The state machine 400 takes input in the form of received messages and/or timeouts. The output of the state machine 400 determines whether the node 120 is going to share data, request another node 120 to share data, send an advertisement, set timeouts, or invoke a data handler 280 on newly received data.

In the advertise state 420, the local node 120 will periodically send a message advertising a version identifier corresponding to data stored in the local node 120. In one embodiment, the version identifier comprises all data versions or a hash of all data versions on the local node 120. This advertising message is received by the neighboring nodes 120 and used by their respective comparison module 350 to compare the data versions and determine if nodes 120 have differing data. When the local node 120 receives an advertising message, it will compare the version identifier in the advertising message with the version identifier corresponding to the data stored in the storage module 320. If the version in the advertising message matches the version in the storage module 320, the node 120 remains 405 in the advertise state 420.

On the other hand, if the local node 120 receives a message advertising a version identifier corresponding to new data, it will transition 425 from the advertise state 420 to the request state 440 and begin transmitting requests for neighboring nodes 120 to share the new data. When the neighboring nodes 120 receive the message requesting the new data, they will transition 435 from the advertise state 420 to the share state 460 and choose a time to start transmitting the requested data. In one embodiment, the time is chosen randomly. Thus, the first node 120 to share will start transmitting the requested data. Meanwhile, the other neighboring nodes 120 will overhear the transmission from the first node 120 and therefore suppress their own transmissions to allow the first node 120 to finish its transmission. The requesting node 120 remains 465 in the request state 440 until it receives the completed data. Once the requesting node 120 has the completed data, it will transition back 415 to the advertise state 420. A node 120 can also transition 445 from the request state 440 to the share state 460 if it overhears a message requesting for data and it has the requested data available to share.

Furthermore, if a node 120 in the request state 440 receives an advertising message containing a data version older than the data version in its own storage module 320, the requesting node 120 will transition 445 from the request state 440 to the share state 460. In the share state 460, the node 120 will back off for a random period of time and then begin transmitting the new data. If the node 120 overhears another node 120 transmitting data, it will stop its own transmission and wait for the other to finish. The sharing node 120 remains 475 in the share state 460 until it finishes sharing data. If the sharing node 120 receives another message advertising new data, the node 120 will transition 455 from the share state 460 to the request state 440 and begin transmitting a message requesting the new data.

In an example embodiment, a method for disseminating data of a local node 120 to a remote node 120 according to the data dissemination protocol 260 corresponding to the state machine 310 as depicted in FIG. 4 comprises the following steps: storing data and a version identifier of the data in a local storage node; transmitting a message advertising a version identifier corresponding to the data stored in the local node storage; receiving a message requesting data corresponding to a version identifier from a remote node in the network; determining whether the version identifier corresponding to the data requested by the remote node is the same as the version identifier corresponding to the data stored in the local node storage; and if so, transmitting a message sharing the data stored in the local node storage.

According to one embodiment, the method described above further comprises the steps of receiving a message advertising a version identifier corresponding to data stored in a remote node storage; determining whether the version identifier received from the advertising message indicates a newer version than the version identifier corresponding to the data stored in the local node storage; if so, transmitting a message requesting data stored in the remote node storage; receiving a message sharing the data corresponding to the version identifier stored in the remote node storage; and updating the data and the corresponding version identifier stored in the local node storage with the data and the corresponding version identifier received from the sharing message.

In another example embodiment, a method for disseminating data and the corresponding version identifier stored in a remote node 120 to a local node 120 according to the data dissemination protocol 260 corresponding to the state machine 310 as depicted in FIG. 4 comprises the following steps: storing data and a corresponding version identifier in a local node storage; receiving a message advertising the version identifier corresponding to the data stored in the remote node storage; determining whether the version identifier received in the advertising message indicates a newer version than the version identifier corresponding to the data stored in the local node storage; if so, transmitting a message requesting the data corresponding to the version identifier stored in the remote node storage; receiving a message sharing the data corresponding to the version identifier stored in the remote node storage; and updating the data and the corresponding version identifier stored in the local node storage with the data and the corresponding version identifier received from the sharing message.

According to one embodiment, the method described above further comprises the steps of receiving a message advertising a version identifier corresponding to data stored in a remote node storage; determining whether the version identifier received in the advertising message indicates an older version than the version identifier corresponding to the data stored in the local node storage; and if so, transmitting a message sharing the data and the corresponding version identifier stored in the local node storage.

In an alternative embodiment, the method additionally comprises the steps of transmitting a message advertising a version identifier corresponding to the updated data stored in the local node storage; receiving a message advertising a version identifier corresponding to data stored in a remote node storage; determining whether the version identifier received in the advertising message indicates the same version as the version identifier corresponding to the updated data stored in the local node storage; and if so, pausing the transmission of the message advertising the version identifier corresponding to the updated data stored in the local node storage for a period of time.

Figure 5:
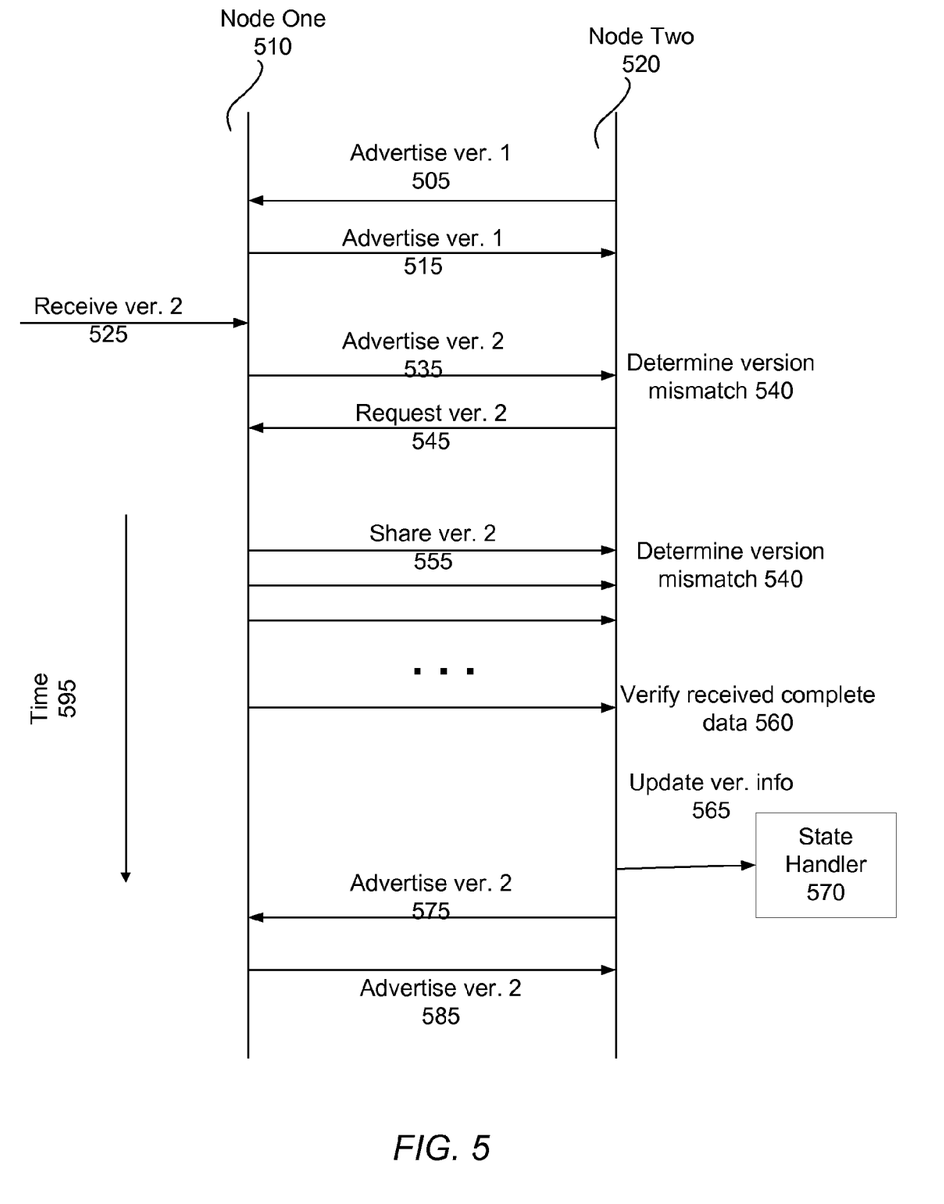
FIG. 5 shows an example of data dissemination between two nodes based on an embodiment of a viral determination protocol.

According to one embodiment, software embodying the present disclosure comprises a computer-readable storage medium configured to store computer instructions that, when executed by a processor, cause the processor to store data and a version identifier of the data in a local storage node; transmit a message advertising a version identifier corresponding to the data stored in the local node storage; receive a message requesting data corresponding to a version identifier from a remote node in the network; determine whether the version identifier corresponding to the data requested by the remote node is the same as the version identifier corresponding to the data stored in the local node storage; and if so, transmit a message sharing the data stored in the local node storage. Turning to FIG. 5, it shows an example of data dissemination between two nodes (i.e., Node One 510 and Node Two 520) based on an embodiment of a viral determination protocol. This diagram shows a typical time line 595 of messages exchanged between Node One 510 and Node Two 520. Each node periodically advertises its current data version. In this example, both Node One 510 and Node Two 520 initially have version 1 of the data in their respective storage modules 320. Therefore, Node One 510 receives an advertising message 505 containing version 1 from Node Two 520.

Similarly, Node Two 520 receives an advertising message 515 containing version 1 from Node One 510. Moments later, Node One 510 receives 525 new data from another link 140 and calculates a new version number (version 2). Node One 510 then begins to advertise 535 the version 2 of the data. Node Two 520 receives the advertising message 535 from Node One 510, compares the version in the advertising message 535 with the version in its own storage module 320, determines that the versions mismatch 540 because Node Two 520 has an older version than Node One 510, and broadcasts a request message 545 for version 2 of the data. Node One 510 receives this request message 545 and begins sharing 555 version 2 of the data. Node Two 520 receives the share message 555 from Node One 510, compares the version in the share message 555 with the version in its own storage module 320, determines that the versions mismatch 540 because Node Two 520 has an older version than Node One 510, and updates its storage module 320 with version 2 of the data received from the share message 555.

When the data transmission is completed, Node Two 520 verifies 560 that it has received a completed and uncorrupted version of the new data (version 2). Once this verification is done, Node Two 520 updates its version information 565, passes the new data to a state handler 570, and begins advertising 575 version 2 of the data. Meanwhile, Node One 510 continues advertising 585 version 2 of the data until it receives another new version of the data.

This figure and description is broadly applicable to situations with several nodes 120 all within communications range. The other nodes would receive the same shared data as Node Two 520 and possibly send more requests if the data transmission was incomplete. Once the other nodes 120 have the new data, they would satisfy any new share requests by transmitting their new data. Random delays and timeouts are used to prevent the nodes from transmitting simultaneously and interfering with each other.

A similar event will occur when a new node 120 joins the network 100. The joining node 120 will overhear a new version or advertise its old version, and the surrounding nodes 120 will update it with the latest data. The data will continue to be uploaded to any nodes 120 that send requests for it. This is the viral nature of the protocol 260, which allows nodes 120 to join the network 100 at a later time yet still receive all relevant data to reach a consistent state across the network 100.

The disclosed embodiments beneficially allow for a simplified dissemination of data in a network environment 100. The management of individual nodes 120 is alleviated by viewing the entire network 100 as a single computing resource and using the viral protocol 260 to disseminate data to every node 120. The disclosed embodiments greatly simplify distributing application logic to a large network of devices, particularly in a network where communications from one side of the network to the other is not possible. The viral nature of the disclosed data dissemination protocol ensures that the application is distributed to all nodes at some point. The disclosed embodiments can be used to disseminate data for communications. They can also be used to configure network parameters, e.g., encryption keys, radio frequency, and data sampling intervals. The effectiveness of the disclosed embodiments does not decrease with the increased network size. The protocol 260 beneficially provides consistent state for lossy links in communication networks having links between devices. Moreover, as noted previously, the protocol beneficially operates with computing devices that may be resource constrained and with any communications network in which such lossy links may be present. The benefits of the disclosed embodiments are not limited to lossy links or resource constrained devices and is broadly applicable to any communications network with a broadcast capability.

Some portions of above description describe the embodiments in terms of algorithms and symbolic representations of operations on information, for example, with respect to FIGS. 3, 4 and 5. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The computer programs or modules (for example, as representations of the processes in FIG. 3, 4, or 5) can be stored as instructions within a computer readable storage medium, for example, a memory or disk). Such instructions are executable by a processing system, for example, a processor, a controller or state machine.

By way of example, the computer-readable storage medium noted above may be further configured to store computer instructions that, when executed by a processor, cause the processor to receive a message advertising a version identifier corresponding to data stored in a remote node storage; determine whether the version identifier received from the advertising message indicates a newer version than the version identifier corresponding to the data stored in the local node storage; if so, transmit a message requesting data stored in the remote node storage; receive a message sharing the data corresponding to the version identifier stored in the remote node storage; and update the data and the corresponding version identifier stored in the local node storage with the data and the corresponding version identifier received from the sharing message.

According to another embodiment, software embodying the present disclosure comprises a computer-readable storage medium configured to store computer instructions that, when executed by a processor, cause the processor to store data and a corresponding version identifier in a local node storage; receive a message advertising the version identifier corresponding to the data stored in the remote node storage; determine whether the version identifier received in the advertising message indicates a newer version than the version identifier corresponding to the data stored in the local node storage; if so, transmit a message requesting the data corresponding to the version identifier stored in the remote node storage; receive a message sharing the data corresponding to the version identifier stored in the remote node storage; and update the data and the corresponding version identifier stored in the local node storage with the data and the corresponding version identifier received from the sharing message.

The computer-readable storage medium described above may be further configured to store computer instructions that, when executed by a processor, cause the processor to receive a message advertising a version identifier corresponding to data stored in a remote node storage; determine whether the version identifier received in the advertising message indicates an older version than the version identifier corresponding to the data stored in the local node storage; and if so, transmit a message sharing the data and the corresponding version identifier stored in the local node storage.

In an alternative embodiment, the computer instructions stored on the computer-readable storage medium described above may also cause the processor to transmit a message advertising a version identifier corresponding to the updated data stored in the local node storage; receive a message advertising a version identifier corresponding to data stored in a remote node storage; determine whether the version identifier received in the advertising message indicates the same version as the version identifier corresponding to the updated data stored in the local node storage; and if so, pause the transmission of the message advertising the version identifier corresponding to the updated data stored in the local node storage for a period of time.

As will be apparent to one of ordinary skill in the art, the computer instructions described above may exist in any form, e.g., source code, object code, interpreted code, etc. Further, the computer instructions may be stored in any computer-readable storage medium, e.g., a read only memory (ROM), a random access memory (RAM), a flash memory, a magnetic disk media, a compact disc, a DVD disc and the like. Such software may also be in the form of an electrical data signal embodied in a carrier wave propagating on a conductive medium or in the form of light pulses that propagate through an optical fiber.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a method for reliably disseminating data across a large communications network through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for disseminating first data of a first remote node to a local node in a network, the first remote node storing the first data, a first index, and a first version identifier in a first remote node storage, the first index uniquely identifying the first data across all versions of that data, the method comprising:

storing second data, a second index, and a second version identifier in a local node storage, the second index uniquely identifying the second data across all versions of that data;

receiving a first message advertising the first index and first version identifier corresponding to the first data stored in the first remote node storage;

determining, in response to receiving the first message and the first index corresponding to the second index, whether the first version identifier indicates a newer version than the second version identifier;

transmitting, in response to the first version identifier indicating a newer version than the second version identifier, a second message requesting the first data corresponding to the first version identifier and first index;

receiving a third message sharing the first data corresponding to the first version identifier and first index;

updating, in response to receiving the third message, the second data, the second index, and the second version identifier stored in the local node storage with the first data, first index, and the first version identifier received in the third message;

transmitting, in response to the updating, a fourth message advertising the first index and first version identifier;

receiving a fifth message advertising a third index and a third version identifier corresponding to third data stored in a second remote node storage;

determining, in response to receiving the fifth message, whether the third index and third version identifier indicate the same version as the first index and first version identifier; and pausing, in response to the third index and third version identifier indicating the same version as the first index and first version identifier, the transmission of the fourth message for a period of time.

2. The method of claim 1, further comprising:
verifying, in response to updating the second data, the second index, and the second version identifier with the first data, the first index, and the first version identifier, that the complete first data is received.

3. The method of claim 1, further comprising:
verifying that the received first data is error free.

4. The method of claim 1, further comprising:
determining, in response to receiving the fifth message, whether the third version identifier indicates an older version than the second version identifier; and
transmitting, in response to the third version identifier indicating an older version than the second version identifier, a sixth message sharing the second data corresponding to the second data identifier stored in the local node storage.

5. The method of claim 1, wherein the period of time comprises a bounded random period of time.

6. A method for disseminating data in a network, the method comprising:
storing the first data, a first index, and a first version identifier in a local node storage, the first index uniquely identifying the first data across all versions of that data;
transmitting a first message advertising the first index and the first version identifier corresponding to the first data stored in the local node storage;
receiving a second message requesting second data corresponding to a second index and a second version identifier from the first remote node in the network, the second index uniquely identifying the second data across all versions of that data;
determining, in response to receiving the second message, whether the second index and second version identifier indicate the same version as the first index and first version identifier;

transmitting, in response to the second index and second version identifier indicating the same version as the first index and first version identifier, a third message sharing the first data stored in the local node storage;

receiving a fourth message advertising a third index and a third version identifier corresponding to third data stored in a second remote node storage;

determining, in response to receiving the fourth message, whether the third index and the third version identifier indicates a newer version than the first index and first version identifier;

transmitting, in response to the third index corresponding to the first index and the third version identifier indicating a newer version than the first version identifier, a fifth message requesting third data corresponding to the third index and the third version identifier;

receiving a sixth message sharing the third data corresponding to the third index and third version identifier;

updating, in response to receiving the sixth message, the first data, the first index, and the first version identifier stored in the local node storage with the third data, the third index, and the third version identifier received in the sixth message; and transmitting a seventh message advertising the third data corresponding to the third index and third version identifier.

7. The method of claim 6, further comprising:
verifying, in response to the first data, first index, and the first version identifier being updated with the third data, third index, and the third version identifier, that the complete third data is received.

8. The method of claim 6, further comprising:
verifying that the received third data is error free.

9. The method of claim 6, wherein the local node is a mote.

10. The method of claim 6, wherein the network is a lossy network.

11. The method of claim 6, wherein the network is an epidemic network.

12. A data communication system for disseminating first data of a first node in a network comprising:
a state machine that comprises an advertise state, a request state, and a share state;
a storage module for storing the first data, as well as a first index and a first version identifier, both corresponding to the first data, wherein the first index uniquely identifies the first data across all versions of that data;
a logic module for processing the first data corresponding to the first index and the first version identifier according to a viral dissemination protocol;
a network interface in communication with the logic module adapted to receive second data corresponding to a second index and a second version identifier from a second node in the network and to transmit the first data, first index, and the first version identifier in the network, wherein the second index uniquely indentifies the second data across all versions of that data;
a comparison module in communication with the logic module for comparing the second version identifier received via the network interface with the first version identifier stored in the storage module, responsive to the second index corresponding to the first index; and
an invocation module in communication with the logic module and the state machine for invoking a state handler to handle a state transition action responsive to the comparison module comparing the second version identifier received via the network interface with the first version identifier stored in the storage module, wherein the state transition action comprises: transitioning the state machine to the request state responsive to the second version identifier indicating a newer version than the first version identifier, transitioning the state machine to the share state responsive to second version identifier indicating an older version than the first version identifier, and transitioning the state machine to the advertise state responsive to the second version identifier indicating a same version as the first version identifier, wherein the invocation module is configured for invoking a specialized handler upon complete and valid reception of a new version of data.

13. The system of claim 12, further comprising:
a managing module for managing timeout in communication with invocation module and the network interface, the managing module causing the network interface module to pause transmission of the first index and the first version identifier for a period of time responsive to transitioning to the advertise state.

14. The system of claim 12, wherein the first node is a mote.

15. The system of claim 12, wherein the network is an epidemic network.

16. A non-transitory computer-readable storage medium configured to store instructions for disseminating data in a network, the instructions when executed by a processor cause the processor to:
store the first data, a first index, and a first version identifier in a local node storage, the first index uniquely identifying the first data across all versions of that data;
transmit a first message advertising the first index and the first version identifier corresponding to the first data stored in the local node storage;
receive a second message requesting second data corresponding to a second index and a second version identifier from the first remote node in the network, the second index uniquely identifying the second data across all versions of that data;
determine, in response to receiving the second message and the second index corresponding to the first index, whether the second version identifier indicates the same version as the first version identifier;
transmit, in response to the second version identifier indicating the same version as the first version identifier, a third message sharing the first data stored in the local node storage;
receive a fourth message advertising a third index and a third version identifier corresponding to third data stored in a second remote node storage;
determine, in response to receiving the fourth message, whether the third index and the third version identifier indicates a newer version than the first index and first version identifier;
transmit, in response to the third index corresponding to the first index and the third version identifier indicating a newer version than the first version identifier, a fifth message requesting third data corresponding to the third index and the third version identifier;
receive a sixth message sharing the third data corresponding to the third index and third version identifier;
update, in response to receiving the sixth message, the first data, the first index, and the first version identifier stored in the local node storage with the third data, the third index, and the third version identifier received in the sixth message; and
transmit a seventh message advertising the third data corresponding to the third index and third version identifier.

17. A non-transitory computer-readable storage medium configured to store instructions for disseminating first data of a first remote node to a local node in a network, the first remote node storing the first data, a first index, and a first version identifier in a first remote node storage, the instructions when executed by a processor cause the processor to:
store second data, a second index, and a second version identifier in a local node storage;
receive a first message advertising the first index and first version identifier corresponding to the first data stored in the first remote node storage;
determine, in response to receiving the first message, whether the first index and the first version identifier indicates a newer version than the second version identifier;
transmit, in response to the first version identifier indicating a newer version than the second version identifier, a second message requesting the first data corresponding to the first index and the first version identifier;
receive a third message sharing the first data corresponding to the first index and first version identifier;
update, in response to receiving the third message, the second data, the second index, and the second version identifier stored in the local node storage with the first data, the first index, and the first version identifier received in the third message;
transmit, in response to the updating, a fourth message advertising the first index and first version identifier;
receive a fifth message advertising a third index and a third version identifier corresponding to third data stored in a second remote node storage;
determine, in response to receiving the fifth message, whether the third index and third version identifier indicate the same version as the first index and first version identifier; and
pausing, in response to the third index and third version identifier indicating the same version as the first index and first version identifier, the transmission of the fourth message for a period of time.

18. The non-transitory computer-readable storage medium of claim 17, the instructions when executed further cause the processing system to:
determine, in response to receiving the fifth message, whether the third version identifier indicates an older version than the first version identifier; and
transmit, in response to the third version identifier indicating an older version than the first version identifier, a sixth message sharing the first data corresponding to the first data identifier stored in the local node storage.

* * * * *

UNITED STATES PATENT AND TRADEMARK OFFICE
CERTIFICATE OF CORRECTION

PATENT NO. : 8,340,131 B2  
APPLICATION NO. : 12/434397  
DATED : December 25, 2012  
INVENTOR(S) : Sharp et al.

Page 1 of 1

It is certified that error appears in the above-identified patent and that said Letters Patent is hereby corrected as shown below:

On the title page, item (60), in Column 1, Lines 1-2, delete "May 28, 2008." and insert
-- May 5, 2008. --, therefor.

Signed and Sealed this
Twentieth Day of October, 2015

Michelle K. Lee
*Director of the United States Patent and Trademark Office*